United States Patent [19]

Morgan

[11] Patent Number: 4,807,849

[45] Date of Patent: Feb. 28, 1989

[54] FLUID FLOW CONTROL DEVICE AND COMPRESSION MEMBER THEREFOR

[75] Inventor: Daniel P. Morgan, Sonoma, Calif.

[73] Assignee: Veriflo Corp., Richmond, Calif.

[21] Appl. No.: 108,431

[22] Filed: Oct. 14, 1987

[51] Int. Cl.$^4$ .............................................. F16K 25/00
[52] U.S. Cl. .................................. 251/362; 251/172; 137/522
[58] Field of Search ................ 251/362, 172; 137/522, 137/543.15

[56] References Cited

U.S. PATENT DOCUMENTS

| | | | |
|---|---|---|---|
| 2,670,922 | 3/1954 | Carlisle et al. | 251/362 |
| 2,751,185 | 6/1956 | Shand | 251/172 |
| 2,799,470 | 7/1957 | Margrave | 251/172 |
| 3,114,391 | 12/1963 | Kurtz | 137/522 |
| 3,181,834 | 5/1965 | Jennings et al. | 251/172 |
| 3,266,769 | 8/1966 | Shand | 251/172 |
| 3,420,493 | 1/1969 | Kraft | 137/543.15 |
| 4,020,864 | 5/1977 | Church, Jr. | 251/172 |

*Primary Examiner*—A. Michael Chambers
*Attorney, Agent, or Firm*—Antonelli, Terry & Wands

[57] ABSTRACT

A fluid flow control device and a compression member therefore permit the clamping of a seal of the device without the presence of internal threads so that high purity can be maintained. The compression member comprises a first suface centrally located on one side of the member for applying a concentrated central force to the seal and a diametrically larger second surface on a second side of the compression member opposite the first side. At least a radially outer portion of the second surface is elevated with respect to a radially inner portion thereof to provide a contact surface upon which the diametrically larger force is applied.

21 Claims, 3 Drawing Sheets

FLUID FLOW CONTROL DEVICE AND COMPRESSION MEMBER THEREFOR

BACKGROUND AND SUMMARY OF THE INVENTION

The present invention relates to an improved fluid flow control device and a compression member therefor As the technology of semiconductor manufacture, as well as the continuing requirement for higher purity of methods and materials in the scientific, chemical and medical fields matures, attention is being given to the elimination of tiny spaces in fluid flow control devices such as pressure regulators, valves and differential pressure control devices, which can entrap particles and vapors. Such entrapment areas are known as "virtual leaks".

Seals such as valve seats in fluid flow control devices must be held tightly in position against high pressures. In the past, threaded connections have been used to hold or clamp such seals in their designed positions. However, it has been recognized that threaded means can be a source of virtual leaks. Thus, there is a need for an "internally threadless" fluid flow control device in order to insure high purity.

An object of the present invention is to provide an improved fluid flow control device which avoids the aforementioned problem of virtual leaks due to the presence of threaded means. More particularly, an object of the present invention is to provide an improved fluid flow control device wherein a seal is held or clamped in its designed position without the use of internal threaded means.

A further object of the present invention is to provide an improved fluid flow control device which is internally threadless and at the same time is safe; predictable (in engineering terms); unaffected by stressing of the body or cap, heat, cold, vibration or shock; offers clean polished surfaces with low drag to the gas or liquid stream; is designed for a minimum number of parts; offers an absolute minimum of surfaces and shapes that provide "virtual leaks"; and which is designed for minimum assembly time with no possibility of errors.

These and other objects of the invention are attained by the improved fluid flow control device and compression member therefor according to the present invention. The compression member is an engineered structural member, of suitable size, which secures a replaceable seal such as a valve seat in a fluid flow control device such as a pressure regulator or a valve against high forward or reverse pressures. The compression member transmits or produces a concentrated central force on the seal from a diametrically larger force or position.

According to the disclosed embodiment, the larger diameter force or position is transmitted to the compression member through a diaphragm of the fluid flow control device. The diaphragm isolates the compression member and the associated seal from the outside. Since the seal, and the compression member, are generally in the process gas or liquid stream, such sealing off from the outside is important for safety as well as conservation of process materials.

The compression member of the invention acts as a unit load multiplier in the illustrated embodiment producing a relatively high pressure on a small seal with a substantial axial loading being applied to the outer edges of the compression member. The compression member localizes the force on the clamping area acting on the seal. When the force on the compression member is applied with suitable angularity as in the disclosed embodiment, the compression member tensions the diaphragm radially, insuring that it is tight and flat in its unloaded condition.

According to a further feature of the invention, the compression member compresses the seal until a physical stop between the compression member and the body of the device is reached. This results in a fixed preload on the seal, which must be exceeded before a back-pressure can lift the seal and cause a leak through the fluid flow control device. The compression member is designed to produce a predictable preload, which is translated into a back pressure rating for the device.

Since the seal is generally a flat washer-like disc, its axial dimension and the axial dimension of the cavity in the device into which it is clamped can be held to close tolerances with conventional machinery. Thus, the preload established by the geometry of the compression member and the device can be held to an acceptable tolerance in psi without the use of special machine processes.

The compression member is preferably configured as a saucer-like device of an appropriate diameter shaped as a constant stress cantilever of resolution. More particularly, experiments by applicant have shown that the conical shape of the preferred embodiment can be made into a constant stress member with a predictable spring rate which is linear over a sufficiently long range for the necessary preloading in the fluid flow control device. While linearity is not necessary to the functioning of the device it does make the tolerancing of the parts easier.

The compression member is loaded in the fluid flow control device with a strong threaded cap which is screwed down tight against a machine stop so as to preload the compression member to a fixed deflection, with the threads being located outside the fluid passage means of the fluid being regulated or valved with the device. The compression member can yield plastically to some extent during installation as long as the residual force on the seal is sufficient for the intended purpose.

In the preferred embodiment, the compression member comprises a first surface centrally located on one side of the member for applying the concentrated central force and a diametrically larger second surface on a second side of the member opposite the first side, at least a radially outer portion of the second surface is elevated with respect to a radially inner portion thereof to provide a contact surface upon which the diametrically larger force is applied. Fluid passage means extends through the compression member along center axis thereof from the first surface to the second surface. The compression member also includes a portion thereof formed with an increased height as a stop means adjacent the first surface for limiting the movement of the first surface in its application of the concentrated central force.

The height of the second surface of the compression member is preferably progressively increased in a radially outward direction of the compression member. According to the preferred form of the invention, the second surface tapers upwardly at an angle of between 60° and 20° with the second surface of the compression member being defined at least in part by an outwardly protruding annular arm of the compression member which tapers radially outwardly and upwardly. The thickness of the arm is progressively reduced in a radially outward direction and the arm is joined to a central portion of the compression member by way of an undercut groove so that the arm is uniformly stressed along the length thereof in response to the application of the diametrically larger force to the contact surface thereof. This enables the arm to have spring rate under the application of the diametrically larger force which is at least approximately linear over a bending displacement of the radially outer end of the arm of at least 0.010 inch.

The fluid flow control device of the invention comprises the compression member and compressible seal means. The first surface of the compression member transmits the concentrated central force to the seal means of the device in response to the application of the diametrically larger force to the contact surface of the device to thereby clamp the seal in an internally threadless manner so as to avoid virtual leaks. The seal is a valve seat which cooperates with a valve of the device for controlling the flow of a fluid through the device according to the disclosed embodiment. The device further includes means for applying the diametrically larger force of the contact surface of the compression member. The means for applying the diametrically larger force comprises a flexible diaphragm adjacent the compression member through which the larger force is transmitted to the compression member. The fluid flow control device ca be a pressure regulator, valve, differential pressure control device or other fluid flow control device. A body cavity of the device is configured such that the seal as well as the compression member can be dropped in place in appropriate order, the diaphragm added and the clamping cap or ring tightened as various surfaces interlock to guide the part into their designed position. This self centering speeds assembly and reduces the possibility of mistakes.

These and other objects, features and advantages of the present invention will become more apparent from the following description when taken in connection with the accompanying drawings, which show, for purposes of illustration only, one preferred embodiment in accordance with the present invention.

DETAILED DESCRIPTION OF THE DISCLOSED EMBODIMENT

Figure 1:
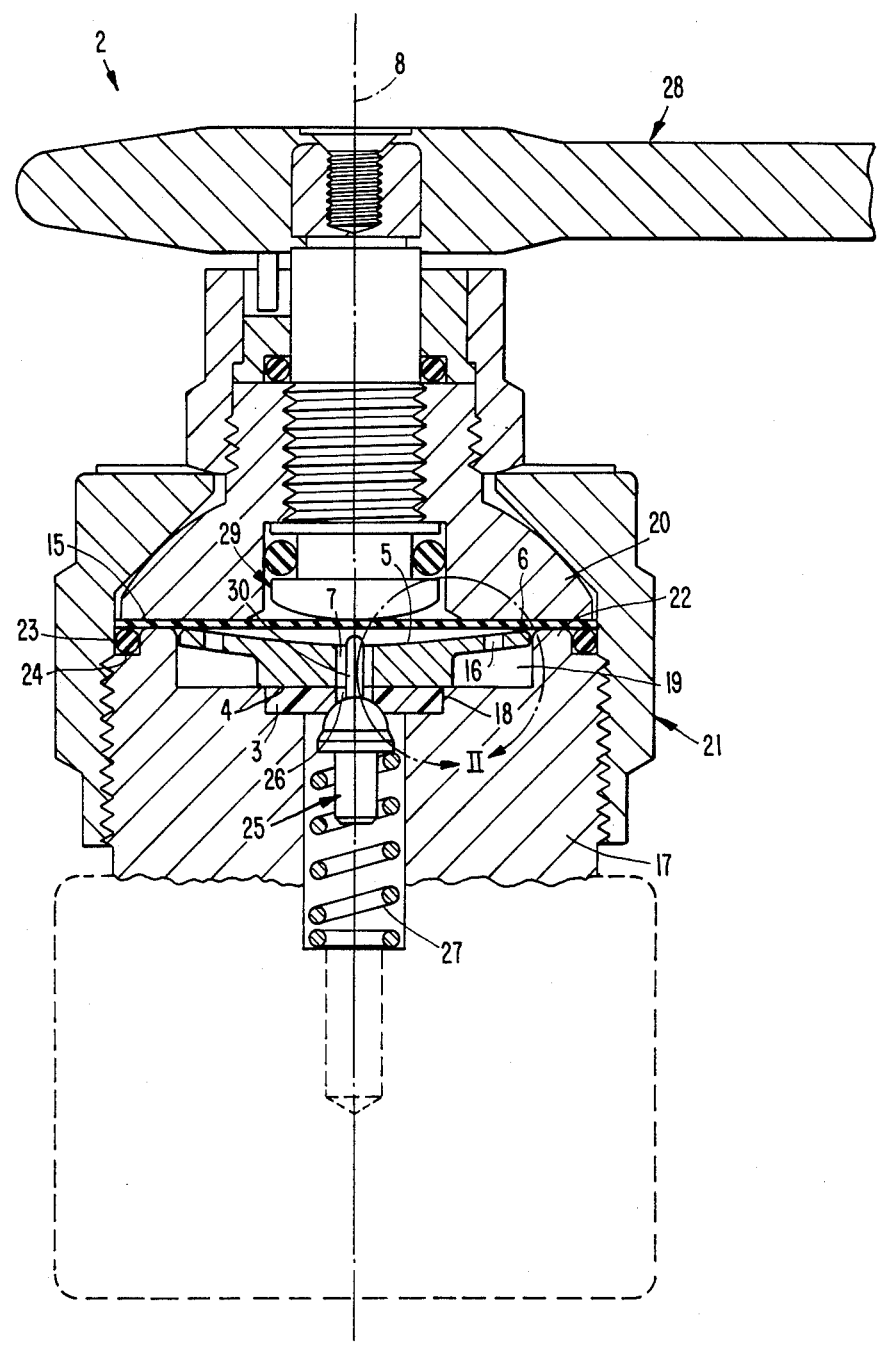
FIG. 1 is a cross-sectional view through a fluid flow control device with a compression member according to the invention.

Referring now to the drawings, a compression member 1 of the invention is shown in use in a fluid flow control device 2 according to the invention for transmitting force to produce a concentrated central force on a seal 3 of the device 2 from a diametrically larger force. The compression member 1 comprises a first surface 4 centrally located on one side of the compression member for applying the concentrated central force to the seal 3 and a diametrically larger second surface 5 on a second side of the member 1 opposite the first side. A radially outer portion 6 of the second surface 5 is elevated with respect to the radially inner portion thereof to provide a contact surface upon which the diametrically larger force is applied.

Figure 2:
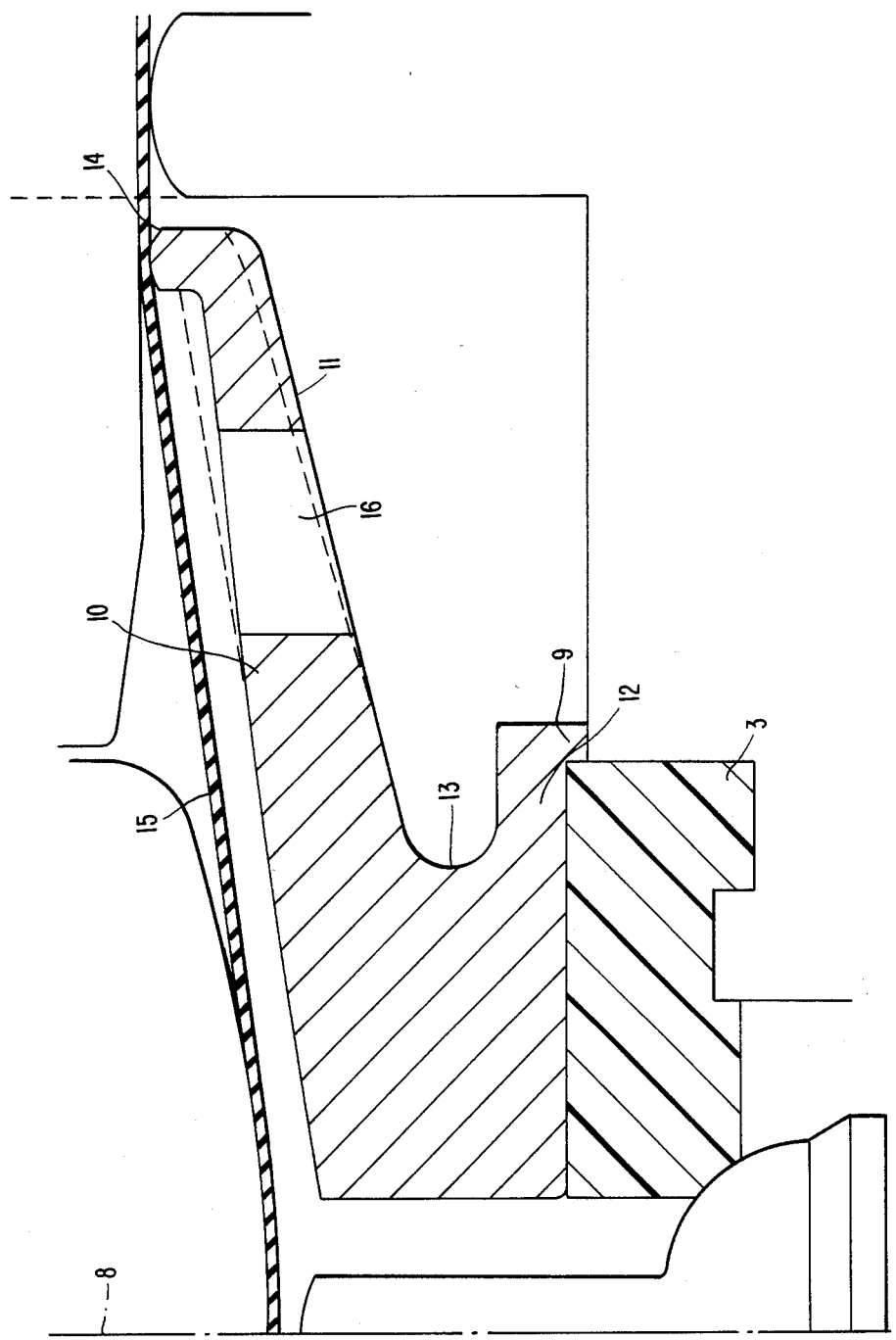
FIG. 2 is an enlarged view of a portion of FIG. 1 within the dashed circle II shown in FIG. 1 and illustrating a portion of the compression member in its position of use in clamping engagement against valve seat of the flow control device of FIG. 1.
Figure 3:
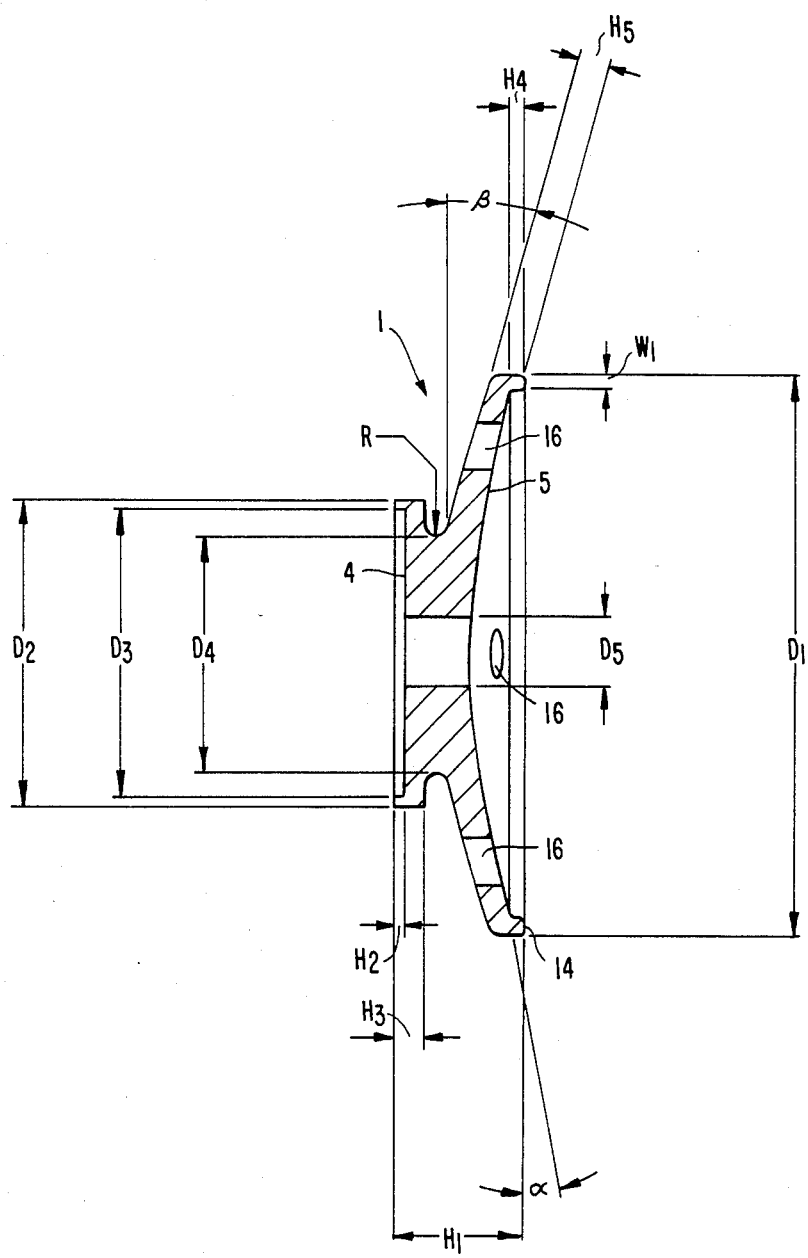
FIG. 3 is a full, detailed cross-sectional view of the compression member shown in FIGS. 1 and 2.

A compression member 1 is formed with a fluid passage 7 through the compression member along a center axis 8 of the member from the first surface 4 to the second surface 5. As is shown in FIGS. 2 and 3, an annular rim 9 is formed about the first surface 4 and acts as a stop for limiting the movement of the first surface 4 in its application of the concentrated central force to the seal 3. The height of the second surface 5 of the compression member is progressively increased in a radially outward direction of the member. More particularly, the second surface tapers upwardly at an angle of between about 6° and 20° with respect to the plane extending perpendicularly to the center axis 8 of the member The angle of taper $\alpha$ of the second surface in the illustrated embodiment is 9°.

The second surface 5 of the compression member is defined in part by an outwardly protruding annular arm 10 of the compression member which extends radially outwardly and upwardly. The thickness of the arm 10 is progressively produced in a radially outward direction. The lower surface 11 of the arm tapers outwardly at an angle $\beta$ of between 10° and 20° with respect to the plane extending perpendicular to the center axis 8 of the compression member 1. In the illustrated embodiment the angle $\beta$ is 16°. If the angle at which the arm 10 tapers outwardly is too small, the arm is essentially flat and an over center action can occur such that the arm acts as a clicker under the application of the diametrically larger force to the outer peripheral portion the second surface 5. For example, if the angle $\beta$ is under 10°, the arm 10 of the compression member 1 can go flat and cause a drastic change in the stress pattern. On the other hand, if the angle $\beta$ is too steep, in excess of 20°$\Psi$ the arm is too stiff and acts as a wedge such that the necessary deflection of the outer end of the arm 10 cannot be obtained or at least cannot be obtained with the desired preloading force.

The lower surface 11 of the arm 10 is joined to a central portion 12 of the compression member 1 by way of an undercut groove 13. The outer peripheral portion of the second surface 5 is formed with an annular rim 14 thereon which forms the contact surface to which the diametrically larger force is applied. The rim 14 also acts as spacer to keep a diaphragm 15 of the fluid flow control device 2 from obstructing the four uniformly spaced fluid passages 16 formed in the arm 10 as shown in the drawings. The tapered configuration of the arm 10 and the undercut groove 13 in the lower central portion 12 of the compression member make a constant stress member of the compression member. That is, all parts of the arm 10 of the compression member are stressed equally as the arm of the compression member bends during loading. Without the undercut portion 13, the compression member would be overstressed at the intersection of the central portion 12 with the lower surface 11 of the arm 10.

When the diametrically larger force is applied to the annular rim or protrusion 14 of the second surface 5 of the compression member 1, the compression member acts as a unit load multiplier. For example, the unit loading on a typical seal 3 of ⅜ inch diameter can be as high as 6,500 psi with an axial loading on the outer edges of the compression member of 480 lbs. The compression member localizes the force on the clamping area against the seal 3 to compress the seal until the stop 9 adjacent the first surface 4 contacts the body 17 of the device 2 as shown in FIG. 2. When the force on the compression member 1 is applied in the manner illustrated in FIG. 1, the compression member, because it is tapered upwardly and outwardly, tensions the diaphragm 15 radially, insuring that it is tight and flat in its unloaded condition.

When the seat 3 has been compressed until the stop 9 of the compression member contacts the body 17 of the device 2, a fixed preload is applied to the seal 3, which must be exceeded before a back-pressure in the device 2 can lift the seat from the body 17 and cause a leak. The compression member 1 is designed to produce a predictable preload, which is translated into a back pressure rating for the fluid flow control device 2.

The compression member 1 can yield plastically to some extent during installation in the fluid flow control device 2 as long as the residual force on the seal 3 will be sufficient for the purpose. The compression member 1 can be formed of 316 stainless steel, for example, with sufficient residual force to accomplish a seal resistant to 2,000 psi fluids with a safety factor. In the event of a different configuration or higher fluid pressure, the compression member can be made of an alloy with high yield strength, such as Elgiloy, Incalloy 925, Hastelloy or 440 C stainless steel, for example.

The seal 3 in the control device 2 is a florocarbon material such as Kel-F. The seal 3 in the illustrated embodiment has a ⅜ inch diameter and is 0.040 inch thick. It can withstand pressures of about 7,500 psi before deforming and yields approximately 0.010 inch under the loading force from the compression member 1 before the stop 9 contacts the body 17 of the device 2 to prevent further compression of the seal.

The body 17 of the device 2 is formed with a recess 18 for receiving the seal 3 such that the upper portion of the seal extends above the plane of the body 17 for cooperation with the first surface 4 of the compression member 1. The body 17 is also formed with a larger recess or cavity 19 above the recess 18 for receiving the compression member 1. The recesses or cavities 18 and 19 of the body 17 are configured such that the seal and compression member can be dropped in place in an appropriate order, the diaphragm 15 added, and a clamping cap or ring 20 of the device 2 tightened by means of the threaded nut 21 as shown in FIG. 1 for loading the compression member. The various surfaces interlock to guide the parts into their designed position. This self centering speeds assembly and reduces the possibility of mistakes. The clamping cap or ring 20 causes the upper, outer portion of the arm 10 of the compression member to be bent downwardly at least elastically during assembly to load the compression member and seal 3 by way of the diaphragm 15 until the ring 20 contacts an annular stop 22 of the body 17 about the recess 19. An 0-ring seal 23 is compressed in a channel 24 of the body 17 outside the stop 22 by means of the diaphragm 15 and clamping ring 20 to prevent leakage of the fluid outside of the recess 18 of the body.

By way of example, the compression member 1 of the illustrated embodiment an outer diameter $D_1$ of 0.726 inch and a height $H_1$ of 0.169 inch. The diameter of $D_3$ of the surface 4 of the compression member 1 is 0.373 inch. The diameter $D_4$ at the inner portion of the undercut groove 13 is 0.304. The outer diameter $D_2$ of the annular stop 9 is 0.410 inch and the height $H_2$ of the annular stop 9 above the first surface 4 of the compression member is 0.010 inch. The height $H_3$ of the base of the compression member is 0.040 inch. The annular protrusion 14 on the surface 5 of the compression member has a height $H_4$ of 0.020 inch. The diameter $D_5$ of the fluid passage 7 through the center axis of the compression 1 is 0.090 inch. The width $W_1$ of the annular protrusion 14 on the surface 5 is 0.020 inch and the height $H_5$ of the outer portion of the arm together with the annular protrusion 14 is 0.048 inch. Of course, other sizes and dimensions for the compression member 1 can be employed as will be readily apparent to the skilled artisan. As an example, the outer diameter of the compression member could be on the order of 1½ inches in a larger fluid flow control device. The radius of curvature R of the curved undercut groove 13 is 0.015 inch in the illustrated embodiment.

The seal 3 in the fluid flow control device 2 is a valve seat which cooperates with a valve 25 of the device 2 for opening and closing a fluid passage 26 through the center of the seal 3 coincident with the fluid passage 7 through the center axis of the compression member 1 as shown in FIG. 1. A spring 27 biases the valve 25 against the seat 3 to prevent fluid flow through the device 2 in the absence of a downward pressure on the valve 25 sufficient to compress the spring 27 and move the valve 25 away from the valve seat 3. Fluid under pressure is introduced into the recess 19 of the body 17 of the device in a location beneath the arm 10 of the compression member through an inlet passage, not shown. The pressurized fluid flows through the four fluid passages 16 in the arm 10 and acts against the valve 25 through the fluid passages 7 and 26 in the compression member and seat 3. When a fluid pressure is sufficient to overcome the bias of the spring 27 the valve 25 moves away from the valve seat to allow the flow of fluid through the control device 2. Thus, the fluid flow control device 2 acts as a regulator. The valve 25 can also manually be opened by rotating a tool 28 to advance a plunger 29 of the device 2 against the diaphragm 15 until it interacts with a pin 30 protruding from the leading edge of the valve 25.

While I have shown and described only one embodiment in accordance with the present invention, it is understood that the same is not limited thereto, but is susceptible to numerous changes and modifications as known to those skilled in the art. For example, the compression member of the present invention can be used in fluid flow control devices other than the pressure regulator disclosed herein, such as in valves, differential pressure control devices, etc. The compression member can also be used to compress not only valve seats but other sealing means in such fluid pressure control devices. Therefore, I do not wish to be limited to the details shown and described herein, but intend to cover all such changes and modifications as are encompassed by the scope of the appended claims.

I claim:

1. A compression member for acting as a unit load multiplier for transmitting force to produce a concentrated central force from a diametrically larger force, said compression member comprising a first surface centrally located on one side of said member for applying said concentrated central force and a diametrically larger second surface on a second side of said member opposite said first side, at least a radially outer portion of said second surface being located radially outward from said opposite first surface and being elevated with respect to a radially inner portion of said second surface to provide a contact surface upon which said diametrically larger force is applied and wherein said compression member is formed of a material having sufficient structural integrity for transmitting said diametrically larger force applied to said contact surface to said centrally located first surface.

2. A compression member according to claim 1, further comprising fluid passage means extending through said compression member from said first surface to said second surface.

3. A compression member according to claim 2, wherein said fluid passage means extends along a center axis of said compression member.

4. A compression member according to claim 1, wherein said compression member includes a portion thereof formed with an increased height as a stop means for limiting the movement of the first surface its application of a concentrated central force.

5. A compression member according to claim 1, wherein the height of said second surface is progressively increased in a radially outward direction of said compression member.

6. A compression member according to claim 5, wherein said second surface tapers upwardly at an angle of between 6° and 20°.

7. A compression member according to claim 1, wherein said second surface of said compression member is defined at least in part by an outwardly protruding annular arm of said compression member which extends radially outwardly and upwardly at an angle between 6° and 20°.

8. A compression member according to claim 7, wherein said arm has a spring rate under the application of said diametrically larger force which is at least approximately linear over a bending displacement of the radially outer end of said arm of at least 0.010 inch.

9. A compression member according to claim 7, wherein the thickness of said arm is progressively reduced in a radially outward direction.

10. A compression member according to claim 9, wherein said compression member and the arm thereof are configured so that said arm is uniformly stressed along the length thereof in response to the application of said diametrically larger force to said contact surface thereof.

11. A compression member according to claim 9, wherein the side of said arm opposite said second surface is joined to a central portion of said compression member by way of an undercut groove.

12. A compression member according to claim 7, wherein said arm is provided with fluid passage means therethrough located radially inwardly of said contact surface.

13. A compression member according to claim 1, wherein said contact surface is formed by an annular protrusion on the outer periphery of said second surface.

14. A compression member according to claim 1, in combination with a fluid flow control device comprising compressible seal means, said first surface of said compression member transmitting said concentrated central force to compress said seal means of said device in response to the application of said diametrically larger force to said contact surface of said device.

15. A fluid flow control device according to claim 14, wherein said seal means is a valve seat which cooperates with a valve of said device for controlling the flow of a fluid through said device.

16. A fluid flow control device according to claim 14, wherein said device further comprises means for mechanically applying said diametrically larger force to said contact surface of said compression member.

17. A fluid flow control device according to claim 16, wherein said means for mechanically applying said diametrically larger force comprises a flexible diaphragm adjacent said compression member through which said larger force is transmitted to said compression member.

18. A fluid flow control device according to claim 16, wherein said device includes a stop for limiting the movement of said means for applying said larger force to thereby limit the force applied to said compression member.

19. A fluid flow control device according to claim 14, wherein said device is a pressure regulator.

20. A fluid flow control device according to claim 14, wherein said device further includes a body cavity which is configured such that said compression member is self centered when it is placed therein during assembly of said device.

21. A fluid flow control device according to claim 1, wherein said compression member is formed of metal.

* * * * *